Patented Dec. 30, 1924.

1,520,924

UNITED STATES PATENT OFFICE.

WILLIAM S. BALDWIN, OF HOUSTON, TEXAS.

INSECTICIDE.

No Drawing. Application filed January 3, 1924. Serial No. 684,199.

*To all whom it may concern:*

Be it known that I, WILLIAM S. BALDWIN, citizen of the United States of America, residing at Houston, in the county of Harris and State of Texas, have invented certain new and useful Improvements in Insecticides, of which the following is a specification.

The invention is directed to an insecticide, which in use is effective for more or less complete destruction of insect life, both in mature and larva form.

As the destructive work of insects, for example the boll weevil, is in the open, it is apparent that an effective insecticide must be one capable of reaching, searching, and penetrating all parts of the plants or the like being treated, in order that the mature or active insect and also the larva may be reached and destroyed. If the insecticide is of a nature which would be poisonous or harmful to human beings, its character must be such that it will effectively dissipate itself following a period necessary for the destruction of the insect, or in other words leave substantially no trace after a predetermined time following its use.

The insecticide of the present invention therefore includes essentially the following ingredients; crude petroleum oil, used largely as a vehicle, chloroform for its well known poisonous effect, and oil of mustard, either natural or synthetic, for its destructive effect.

The crude petroleum oil which in itself is to some degree destructive of insect life, may be found too heavy for the effective spraying and distributing of the insecticide, and under these circumstances such vehicle may be rendered lighter and more volatile by the use of a lighter oil, such as gasoline, substantially in the proportions of three parts of crude petroleum oil to one part of gasoline.

With the vehicle, either crude petroleum oil, or a mixture of crude petroleum oil and gasoline or other light oil, is mixed a comparatively small proportion of chloroform, and a still smaller proportion of oil of mustard, this mixture providing a complete homogeneous fluid, which is in all probability a chemical mixture, and certainly a mechanical mixture subsequently incapable of separation.

While it is to be understood that for use with different insect life, and probably also in different localities, the proportion of the ingredient may be varied to suit conditions, a more or less perfect mixture for the treatment of certain destructive insects which will be later referred to is about fifty gallons of the vehicle, that is, crude petroleum oil or crude petroleum oil with the lighter oil; six pounds of chloroform; and one pound of oil of mustard, natural or synthetic.

This mixture is to be applied to the plants preferably by spraying, by which application the mixture is initially delivered as a vapor, which is rapidly converted into gaseous form. In this method of application, the vaporous nature of the spray causes the insecticide to cling to the parts of the plant, from which the gaseous product quickly and effectively searches and reaches all crevices and openings in the plant which may contain the larva or grub young of the insect. Thus the insect life is destroyed in its mature form as well as in the larva and intermediate forms, and it is therefore possible to prevent the season recurrence of the insects.

The present insecticide is particularly effective with the boll weevil, though of course destructive of other insect life as well.

The boll weevil bores into the square and boll of the plant, deposits its eggs, and the young grub lives on the juices during the short period required to reach maturity. The mature insect lives on the juices of the plant, and notwithstanding the destructive inroads of this insect on the cotton crop and numerous efforts to destroy it, practically no material result has been gained. It is believed that previous efforts have been of little effect, because in most instances they have rendered the plant unsuitable to sustain the insect and have simply driven it away from the particular plants to others not treated. Furthermore where the insecticide used was of a nature to destroy the mature insect, it was not of a character to reach the larva or grub in the interior of the boll and destroy it, hence such grub rapidly matured and continued its destructive action.

The present insecticide is effective for destroying the mature insect, and by reason of its rapid conversion into a gas, will reach all crevices and openings, and thus as effectively destroy the grub and larva. The effect on the boll weevil has been studied microscopically, and it has been found that the insecticide by reason of its oily nature clings to the insect so that it is forced to inhale the poisonous gas given off, with the immediate effect of the oil of mustard intensified by the chloroform destroying the sight and substantially destroying the sense of smell. Thus the insect is immediately deprived of its ability to reach the desired parts of the plant, or even to take its usual food, and hence is soon dead.

The vaporous gas of the present insecticide is particularly searching in its effect, and if the insecticide is properly applied, all open crevices, spaces, or the like, where the insects may be temporarily found when not on the plant, will be reached and the insects destroyed.

Claims:

1. An insecticide comprising an oily vehicle, chloroform, and oil of mustard.

2. An insecticide comprising crude petroleum oil, chloroform, and oil of mustard.

3. An insecticide comprising crude petroleum rendered more volatile by the addition of gasoline, a comparatively small proportion of chloroform, and a relatively less proportion of oil of mustard.

In testimony whereof I affix my signature.

WILLIAM S. BALDWIN.